Nov. 13, 1962   W. G. GREEN ETAL   3,064,127
PIPE LINE SURVEY INSTRUMENT
Filed Sept. 12, 1956   2 Sheets-Sheet 2

INVENTORS:
WILLIAM G. GREEN &
DALE M. MOODY
BY
J. D. Copeland Jr.
AGENT

United States Patent Office 3,064,127
Patented Nov. 13, 1962

3,064,127
PIPE LINE SURVEY INSTRUMENT
William G. Green and Dale M. Moody, Tulsa, Okla.; said Green assignor, by mesne assignments, to Aquatron Engineering Corp., St. Petersburg, Fla., a corporation of Florida
Filed Sept. 12, 1956, Ser. No. 609,462
9 Claims. (Cl. 250—83.3)

This invention relates generally to devices for the examination of an underground pipe line for determining its condition, and more specifically to an instrument for travelling through the interior of a pipe line to accomplish this examination.

The primary object of this invention is to provide an enclosed instrument which is capable of travelling through the interior of a pipe line for the multiple purpose of determining external and internal flaws in the walls of the pipe, scale in the pipe, water traps, and the presence of electrical currents along the pipe for purposes hereinafter explained.

A secondary object is to provide an instrument of the type described which will accurately chart the location of the conditions enumerated above for subsequent correction.

A still further object of this invention is to provide an enclosed instrument which will both determine and locate the presence of double pipe and pipe joints for information and correlation purposes.

An additional object is to provide a means for recording pipe flaws directly on a moving film chart by utilization of the Curie effect produced by radiation upon a photograph film.

And yet another object of this invention is to provide an enclosed travelling pipe line instrument which contains its own power supply for operation of its instruments and the recording of their results.

And another object is to provide a chart of all of the enumerated observations on a uniform scale for immediate and future reference, so that deterioration of the pipe may be checked from year to year.

A further object is to provide an easy and relatively economical means of checking pipe line at river crossings and other inaccessible places.

These and other objects will be apparent from an examination of the following specification and drawing in which:

FIG. 4 is a rear end view of a modified distance measuring device showing its operational installation in the pipe line.

FIG. 5 is a fragmentary cross sectional view taken along the lines 5—5 of FIG. 4.

FIG. 7 is a fragmentary cross sectional view of the front end section of the instrument showing a modified embodiment of this invention.

Figure 1:
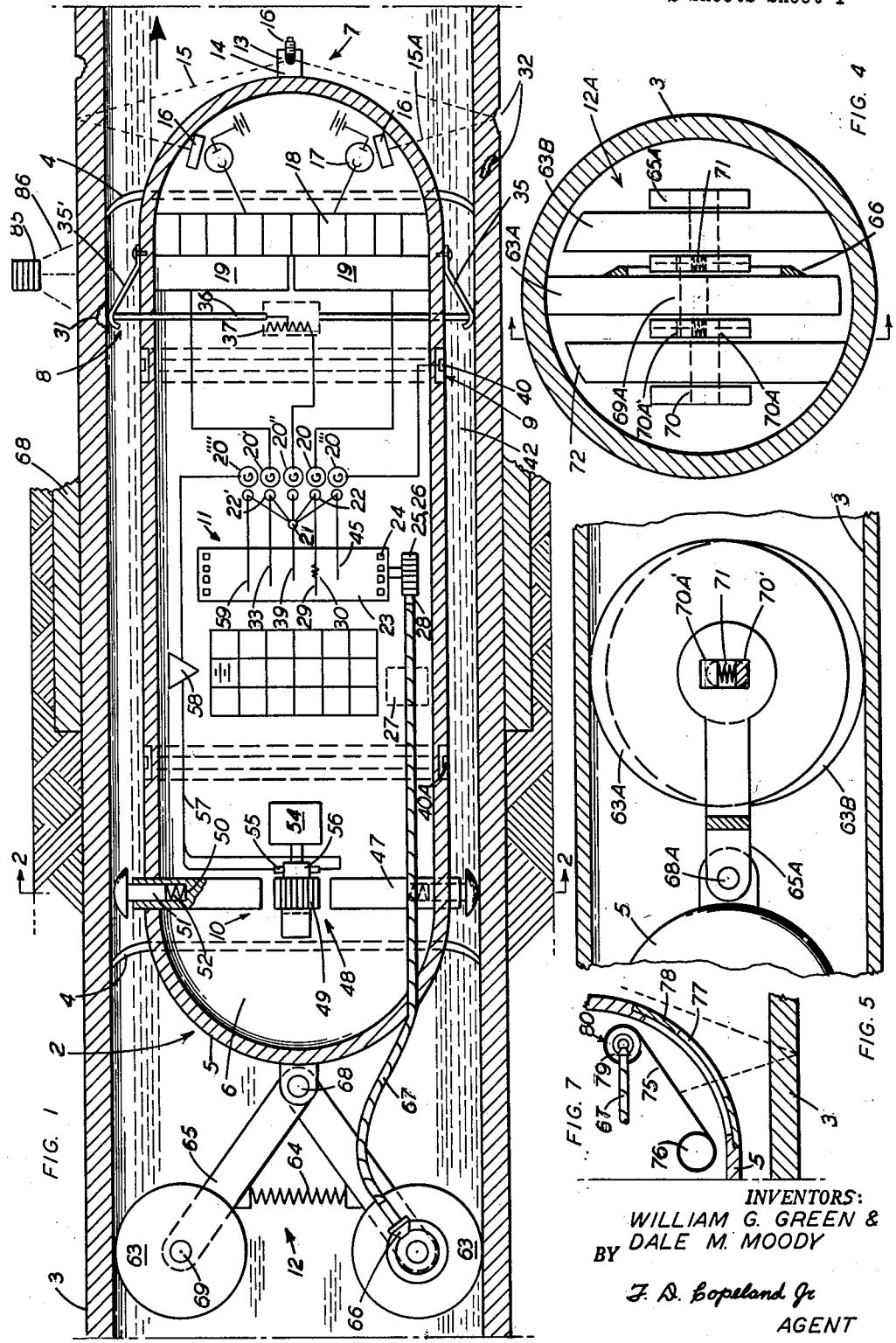
FIG. 1 represents a cross sectional view of the travelling pipe line instrument or "pig" of this invention in a typical installation position within the pipe line.
Figure 2:
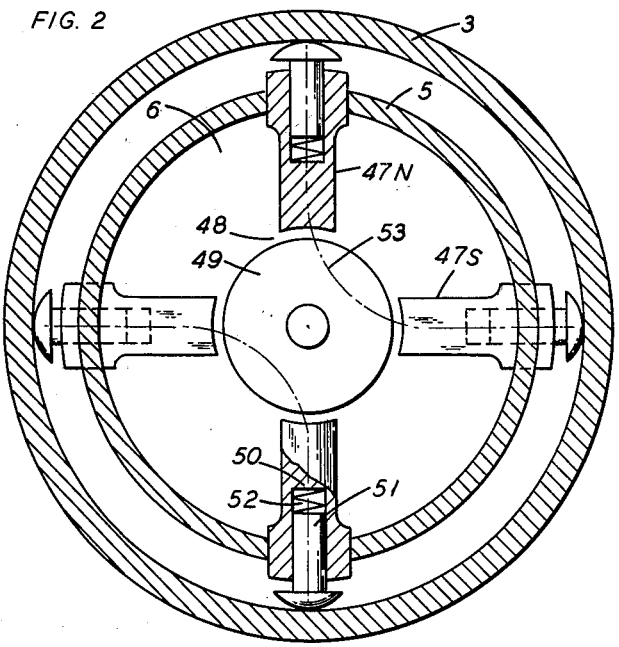
FIG. 2 is a cross sectional view taken along the lines 2—2 of FIG. 1 and showing the method and apparatus for picking up signals if electricity is flowing along the outside of the pipe.

At the present time there are more than 100,000 miles of pipe line placed underground for the purpose of transporting petroleum or gas products. The material of these pipe lines is predominantly steel and therefore subject to corrosion and deterioration which will eventually cause leaks resulting in financial losses and dangerous conditions which imperil both life and property. As a result, it is necessary to maintain constant vigilance throughout the entire length of the pipe line to detect at the earliest possible moment the start of any conditions which would weaken the pipe and cause ultimate leaks.

The size of pipe employed may vary from 2 inches to 36 inches or more in diameter so when the pipe line is laid, it is usually buried several feet below the earth's surface to prevent its being damaged by or interfering with surface activities, such as agriculture, traffic, etc.

However the buried pipe immediately becomes subject to other serious hazards such as chemical action, electrolysis, corrosion, and precipitation of solids on the inside of the pipe.

Operators of pipe lines have developed scraping devices known as "pigs" which are forced through the line in piston-type action by the pressure of the fluid in the pipe which may be as great as 1,000 pounds per square inch. By this action, the pig may be made to cut or scrape any unwanted accumulations, such as paraffin, asphalt, sludge, and the like, from the inside walls of the pipe. This device however cannot anticipate or detect leaks in the pipe line.

Leaks develop under conditions favorable to electrolysis or electro-chemical action, in which the pipe unites with a particular section of the earth, containing chemicals and moisture in the proper relationship, to form a local "battery" or "heat spot" which causes current to flow along the pipe which acts as a conductor for an indefinite distance until the current returns to the earth. Under such conditions, the steel is eaten away by the electro-chemical action at the points where current enters and leaves the pipe. Under the most serious conditions a pipe may develop leaks from these causes in a matter of months, or, under less serious conditions, in a year or two, the whole outer surface of the pipe may be gradually removed by the electro-chemical action to the point that not enough steel remains to withstand the pressure normally used. The operator must then reduce the pressure which obviously reduces the quantity of fluid transported and consequently the income derived.

Because of the above, it has become customary for pipe line companies to go to considerable effort and expense to attempt to protect their lines. Elaborate cleaning and coating practices have developed which are expensive and in many cases impermanent. Electric surveys can be made by surface crews to determine where electric currents are flowing, but the expense and the shortage of trained personnel have forced most operators to make only spot checks in the areas where leaks usually occur, and by this time irreparable damage has already occurred.

Another source of trouble is the condensation of water in tanks, or in the pipe itself, which settles in low areas in the line and absorbs some of the chemicals from the oil or gas to form undesirable compounds, such as sulphuric acid. Almost all petroleum is produced with traces of salt water ($NaCl+H_2O$) with which, under certain conditions the chlorine recombines to form hydrochloric acid (HCl). These and other acids and alkalis produce local internal corrosion.

None of these difficulties may be observed, unaided, after the pipe line is put into service. When electrical survey crews locate a serious amount of current flow (100 ma. or more), usually found by testing in an area adjacent to an established leak, then magnesium anodes or cathodes and rectifiers may be installed to correct the trouble and preseve the pipe indefinitely. However, most electrical surveys are made in dry weather and show no "hot spots," but after a rain, or agricultural treatment of the land, such as irrigating or fertilizing, these "hot spots" are likely to appear.

The causes leading to pipe line leaks may then be summarized as external corrosion due to electrolysis or chemical action, and internal corrosion due to water and chemicals. Since current flowing along the pipe is responsible for all the electrochemical corrosion, and since this current can be neutralized by anodes, and the like, it is essential to learn of its existence as soon as possible.

Referring now more particularly to the characters of reference on the drawing, in FIG. 1, the travelling instrument or pipe line survey pig 2 (somewhat similar in general appearance but not in operation to a pipe line scraping "pig") is shown installed in an underground pipe line 3 and this instrument is adapted to move in the direction of the arrow under the urging of pipe line fluid pressure against the rubber (or other resilient material) sealing flanges 4 at each end of capsule 5 which forms the external housing of instrument chamber 6. The preferred material of capsule 5 is non-magnetic stainless steel.

The instrumentalities carried on capsule 5 (both inside, extending through, and outside thereof) include a radiation analysis assembly 7 for determining cavities in the pipe wall, and determining where the pipe line has extra wall thickness such as external sleeves, fittings, etc., a caliper assembly 8 for measuring the inside diameter of the pipe 3, a water detection assembly 9, an electric current determining assembly 10, a recording assembly 11 to display the information obtained by the above assemblies regarding the danger areas, and attached to the rear end of capsule 5 is a distance measuring wheel assembly 12 by which the recording assembly 11 may display the information obtained relative to the distance travelled by the sealed instrument for accurate location of the danger areas.

Examining each of the above instrumentalities in detail, the radiation analysis assembly indicated generally at 7 includes a signal transmitter such as source 13 of gamma (or other penetrating) rays installed in a suitable housing 14 which will permit circumferential radiation of the radioactive rays indicated at 15 in a direction to impinge on pipe 3. A cover, such as set screw 13A is then threaded into housing 14 to retain source 13 in place. Some of the rays 15A are reflected to or secondary rays excited thereby impinge upon a signal receiver such as scintillation crystals 16 spaced around the circumference of chamber 6 at the forward end of capsule 5. A photocell (or photo multiplier tube) 17 is spaced behind each scintillation crystal 16 and the output of each photocell 17 is connected to a based amplifier 19 which has its output connected to a galvanometer coil 20. A small light source 21 reflects light from a mirror 22 attached to each coil 20 onto a moving film 23 driven by sprocket 24 which in turn is driven by worm gear 25 and pinion 26 which is power driven from the distance measuring wheel assembly 12 through driving output shaft 28 which contains the pinion 26. In a modified embodiment the recording film 23 may be powered by a clock mechanism indicated at 27. The trace 29 which is recorded on film 23 by the reflection of light source 21 from mirror 22 is a steady straight line (see FIG. 6) until one of the individual amplifiers 18 receives a signal which is above the bias level of amplifier 19, in which case the amplifier 19 would excite coil 20 sufficiently to move mirror 22 and cause a series of pips 30 to appear in trace 29. The above threshold signal which would insert pips 30 is caused by a reduced wall thickness of pipe 3, and this reduction could be caused by an internal 31 or external cavity 32 which are identifiable when viewed together with trace 39 of a later described assembly.

The biased amplifiers above also include an upper threshold value which feeds a signal to its galvanometer coil 20' only when the radiation received by detector crystals 16 is greater than the full wall thickness of pipe 3 would return. This signal indicates the presence of an external sleeve or pipe line guard or a fitting of some type and shows up as a relatively steady and longer dip 34 on trace 33 made by reflection of the mirror 22' of coil 20'.

To measure the inside diameter (I.D.) of pipe 3, caliper assembly 8 is installed just to the rear of radiation assembly 7, and includes a series of circumferentially located spring steel cantilever arms 35 which are pressed outward against the I.D. of pipe whereupon they normally ride until one arm 35' comes in contact with an internal cavity 31 which would permit arm 35' to expand and consequently move potentiometer arm 36 which is directly attached to potentiometer 37, the movement of which potentiometer arm 36 causes a signal to be sent to its corresponding galvanometer coil 20" to impose a series of pips 38 on its normally straight trace 39 on film 23.

The next subsequent rearwardly located assembly is is water detection assembly 9 which employs the same basic physics principle that is present when current is passed through an electrolytic bath. Two external electrical conductor rings 40 and 40A are located in insulated rings 41 and 41A at spaced intervals on the circumference of capsule 5. One of the conductor rings 40A may be considered to be the anode and the other ring 40 to be the cathode, and both are inserted in the "bath" 42 which is the fluid which is present in the pipe line. If the bath is entirely oil, the current from a circuit connected to the rings will not flow through the oil to any great extent; however, if salt water is present, and virtually all water occurring around petroleum activities is salt water, then the current will materially increase through this electrolyte. This variation in electrical current thru the rings 40 and 40A will be sent to its galvanometer coil 20''' which reflects this condition of the presence of water by a dip 44 in the water trace 45 of film 23.

Figure 3:
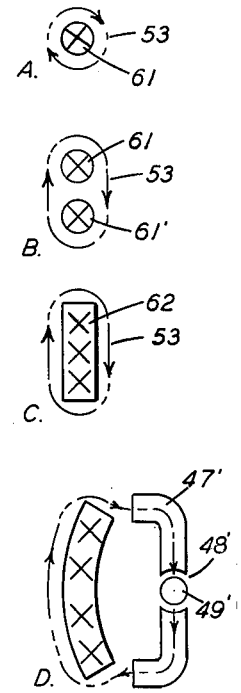
FIG. 3 is a schematic presentation of the theoretical analysis of the operation of the device shown in FIG. 2.

The final instrumentality assembly 10 of travelling instrument 2 is installed for the purpose of detecting the presence of electrical currents in the pipe 3. In FIG. 1 it will be seen that this assembly consists basically of a series of pole pieces 47 which extend outward in the manner of spokes from a hub area 48, having an armature 49 therein. The pole pieces 47 include a recess 50 into which a sliding magnetic material pipe follower 51 is inserted against the pressure of spring 52. By this construction there will always be metal to metal contact to insure sufficient pick up of the relatively weak magnetic flux due to the small amounts of current flowing in the pipe. This flux indicated at 53 will flow from north pole pieces 47N to south pole pieces 47S and in so doing will pass through hub area 48 and create a magnetic field therein. Now armature 49 also occupies this area 48 and when rotated by motor 54 will cut the lines of magnetic force and create an electrical current proportionate to the strength of the field, which thus provides a new application of the generator theory. By installing brushes 55 on the armature commutator 56, an electrical signal may be transmitted through lines 57 to amplifier 58 and subsequently to its galvanometer coil 20'''' and onto film 23 as trace 59 by an action previously described. This trace 59 will be steady and continuous until an electric current enters pipe 3, at which time a dip 60 will appear and will continue until the current leaves pipe 3. The phenomena which makes the operation of assembly 10 possible is shown theoretically in steps A—D of FIG. 3—A shows a single wire 61 in which current is flowing in a direction shown by the symbol (into the paper), and by virtue of the "right-hand rule" the path of flux 53 is in the direction of the arrow. Now if two such wires 61 and 61' are placed close together, the flux path will completely encircle both since the clockwise movement of the flux of wire 61 would be opposed or neutralized by the clockwise path of the flux of wire 61'. Similarly, if the wires are replaced by a bar 62 and several currents are passed therethrough, the flux path 53 will then encircle the entire bar. In FIG. 3-D it will be seen that if a magnetic material conductor 47' is inserted into the flux path 53, that the path will be partially by-passed or short-circuited through the conductor (pole piece) 47' and will create a magnetic field across an open area such as 48' which interrupts its normal path. Now if an armature such as 49' is rotated in this field, it will naturally cut lines of force in the field and will consequently generate electric current proportionate to the number of lines of force thus cut.

At the extreme rear end of capsule 5, a distance measuring assembly 12 is located, as shown in FIG. 1. This assembly includes two vertically spaced wheels 63 which are spring loaded by the action of compression spring 64 acting between levers 65 to insure that rolling contact will be made between the wheels 63 and the interior of pipe 3. An accurate measurement of distance will then be made through bevel gear and pinion set 66 to drive flexible shaft 67 which extends through the rear wall of capsule 5 to connection with shaft 28 which ultimately drives film chart 23 in such a manner that its lower coordinate is distance. Levers 65 are hinged to the rear of capsule 5 by pin 68 and wheels 63 rotate on shafts 69 which are supported by the levers 65.

The embodiment 12A of the rear wheel drive assembly is seen in FIGS. 4 and 5 to employ large diameter wheels 63A and 63B which are supported from a yoke 65A which is hinged to capsule 5 by pin 68A. Wheels 63B are journalled to round shafts 69B which have square ends 70 to engage yoke 65A and their inner ends 70' are cut in half as shown in FIG. 5. Center wheel 63A is journalled to a similar shaft 69A which have similar cut away square ends 70A' to permit insertion of a compression spring 71 to insure wheel contact with the interior of pipe 3. Due to the extra large diameter of these wheels it may be desirable to contour their circumference as at 72 to fit the interior circumference of the pipe walls. A gear and pinion set 66A is employed to rotate flexible shaft 67 in the same manner as the embodiment of FIG. 1.

Figure 6:
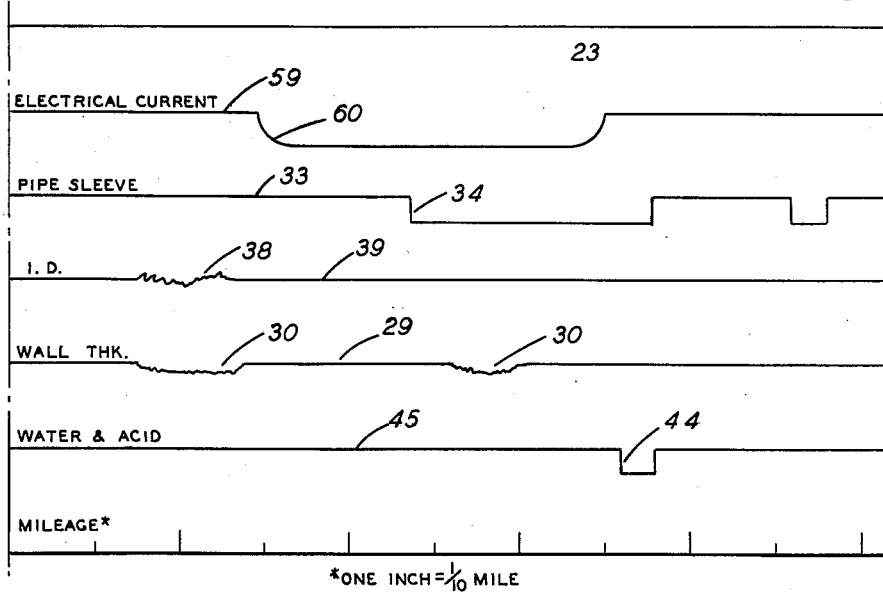
FIG. 6 is a diagrammatic presentation of one form of recording chart which is employed to display and locate the various determinations made by the individual instrumentalities of this travelling pipe line instrument.

By examination of chart 23 of recording assembly 11 which is shown in detail in FIG. 6, virtually all of the information regarding the structural condition of a pipe line may be obtained. The trace 29 indicates and locates the presence of any cavities (mainly caused by corrosion) in the wall of pipe 3. This trace 29 does not of itself indicate whether the cavity is on the outside or inside of the pipe; however, trace 39 is activated by the caliper assembly 8 so that its pips 38 identify the inside diameter signals. Obviously then the difference of pips 30' on trace 29, not shown on trace 39 represents an outside diameter condition. The trace 45 has a pronounced dip 44 to indicate presence of water in the pipes which can and often does occur inside a pipe line at low or trapped points in the line. Trace 33 will contain a relatively long dip 34 when instrument 2 travels under sleeve 68 as when the pipe line crosses a road. And the electric current trace 59 will include both long and short duration dips 60 as instrument 2 travels through areas in which ground generated electricity plays on the pipe. The continuous roll film chart 23 may be calibrated for any desired ordinate spacing (the mile indication on FIG. 6) and the ratio of gears 25-26 and 65-66 may be varied accordingly.

The rear wheel assembly 12 may through its flexible shaft 67 be made to rotate a photographic film 75 (FIG. 7) from a continuous roll 76 past windows 77 made in lead sheets 78 so that film 75 will be exposed in proportion to the amount of radiation received due to the "Curie effect." This phenomena is the proportionate exposure that radioactivity produces on a photographic film. Bevel gear and pinion set 79 are made to rotate film receiver roll 80 in proportion to the rotation of wheels 63 of rear drive assembly 12. The film 75 will then be able to indicate the presence of cavities in pipe wall 3 and due to the drive arrangement will be able to accurately establish their location along the pipe line.

In order to accurately check the distance of travel of instrument 2 through the pipe 3 against known distances along the survey line, a relatively strong radio-active source 85 is located at known distance intervals and between the surface of the ground and pipe line 3. As the instrument 2 passes this point scintillation crystals 16 will be activated by rays 86 and will send a strong signal to galvanometer 20' and the resultant pip on chart 23 will clearly identify the location of this source 85, so that it in effect becomes an easily identifiable reference point.

Each of the above conditions, such as inside or outside cavities, the presence of water in the pipe, or the presence of electrical currents on the pipe, are either actual deterioration or potentially dangerous conditions and the place of existence of either is identified in this specification as a "danger area."

From the foregoing description it will be readily seen that there has been produced a device which substantially fulfills the objects of the invention as set forth herein. The invention is not limited to the exemplary constructions herein shown and described, but may be made in many ways within the scope of the appended claims.

What is claimed is:

1. A sealed instrument for travelling through a horizontal buried pipe line to detect both danger and damaged areas in the wall of the pipe line comprising: means on said instrument to cause it to travel through said pipe line, magnetic means on said instrument to detect danger areas that are caused by electric currents from the ground surrounding the pipe line, means to detect danger areas that are caused by the presence of acid pockets within the pipe line, means to detect actual physical damage in either the outer or inner wall of the pipe line, direct linear means to physically measure the distance of travel of the instrument through the pipe line, separate means to check the distance mesaurement, and means within the instrument to simultaneously record each condition detected at the linear distance location at which it occurred.

2. The method for surveying a buried pipeline to locate damaged areas, comprising: inserting a sealed instrument into a pipeline in engagement therewith introducing fluid under pressure into the pipeline behind the instrument to propel it forward in the pipeline, detecting the presence of damaged areas in the wall of the pipeline, detecting damaged interior surface in said pipeline, positively determining the longitudinal distance of travel of said instrument through said pipeline even tho said pipeline may include large bends, and simultaneously displaying the wall damaged area and the internal surface damaged area in relation to the distance of travel whereby a determination may be made as to the exact damage and the exact location.

3. The method for surveying a buried pipeline to simultaneously locate both damaged areas and danger areas, comprising: inserting a sealed instrument into a pipeline in engagement therewith, introducing fluid under pressure into the pipeline behind the instrument to propel it forward in the pipeline, detecting the presence of both damaged areas in the wall of the pipeline and damaged areas in the interior surface of the pipeline, magnetically detecting the present of danger areas, positively determining the longitudinal distance of travel of said instrument thru said pipeline even tho said pipeline may include large bends, and simultaneously displaying the wall damaged areas and the internal surface damaged areas and the danger areas in relation to the distance of travel whereby a determination may be made as to the exact damage and to the danger and the exact location of each.

4. The method for surveying a buried pipeline to simultaneously distinguish between internal and external damage to said pipeline and to simultaneously distinguish between internal and external danger areas in said pipeline and to locate the internal distance in said pipeline that any said named event takes place and to conveniently locate the external location on the surface of the earth that corresponds to said internal distance, comprising: placing a radiation source on a sealed pipeline instrument including an internal detector, placing a plurality of radiation sources on the surface of the earth above said buried pipeline, inserting said sealed instrument into said pipeline in engagement therewith, introducing fluid under pressure into the pipeline behind the instrument to propel it forward in the pipeline, detecting the presence of both damaged areas in the wall of the pipeline and damaged areas in the interior surface of the pipeline, detecting the presence of internal and external danger areas, positively determining the longitudinal distance of travel of the instrument thru said pipeline even tho said pipeline includes changes of direction, and simultaneously displaying the wall damaged areas and the internal surface damaged areas and the internal and external danger areas in a manner to distinguish between each area all in relation to a positive location of the internal distance of travel of the instrument and a location on the surface of the earth corresponding to the location in the buried pipeline.

5. An apparatus for detecting damaged areas in the external and internal wall surfaces of a buried pipeline and distinguishing each area, comprising: in a sealed instrument for inserting into a pipeline for propulsion therethru, the combination of means for measuring pipeline total wall damage and means for measuring internal surface damage, and means for distinguishing between the total wall damage and the internal surface damage to thereby provide an indication of the external wall damage.

6. An apparatus for detecting both damaged areas and danger areas in the external and internal wall surfaces of a buried pipeline and distinguishing each area, comprising: a sealed instrument for inserting into a pipeline for propulsion therethru, combination of means for measuring pipeline combined internal and external wall damage and means for measuring the internal wall damage only, and means for distinguishing between the combined wall damage and the internal wall damage to provide an indication of the external wall damage, and magnetic means for determining the location of external danger areas and means for determining the location of internal danger areas and means for physically determining the location of internal danger areas and means for physically determining the distance location at which each damaged area and each danger area occurs, and record means for displaying all said determinations inside of said instrument.

7. A means including the apparatus of claim 5 and including a plurality of radiation sources located on the sources located on the surface of the earth above the pipeline to provide a means for locating from the surface the named damaged and danger areas within the buried pipeline and as displayed within said instrument.

8. An apparatus for locating danger areas in a buried pipeline due to the presence of unwanted electric currents between the ground and the pipeline comprising: a sealed instrument for propulsion thru the pipeline, means on said instrument for identifying its location in the pipeline, and magnetic means on said instrument for detecting the presence of an electric current in the wall of said pipeline by providing a short circuit path for the flux surrounding said current, measuring the amount of said short-circuited flux and displaying an indication of said flux in relation to its location in said pipeline.

9. An apparatus for locating danger areas in a buried oil pipeline due to the presence of conducting fluid concentrations therein, comprising: a sealed instrument for propulsion thru the pipeline, circuit means on said instrument for identifying the presence of conducting fluids in the non-conducting oil in said pipeline, and distance measuring means attached to said instrument for identifying the location of said fluid concentrations.

References Cited in the file of this patent
UNITED STATES PATENTS

| | | |
|---|---|---|
| Re. 22,162 | Boynton | Aug. 25, 1942 |
| 1,662,429 | Lowy | Mar. 13, 1928 |
| 2,245,221 | Nudson et al. | June 10, 1941 |
| 2,313,310 | Arnold | Mar. 9, 1943 |
| 2,330,394 | Stuart | Sept. 28, 1943 |
| 2,369,672 | Hare | Feb. 20, 1945 |
| 2,371,628 | Krasnow | Mar. 20, 1945 |
| 2,469,460 | Fearon | May 10, 1949 |
| 2,486,946 | Herzog | Nov. 1, 1949 |
| 2,547,996 | Boucher | Apr. 10, 1951 |
| 2,554,844 | Swift | May 29, 1951 |
| 2,665,187 | Kinley et al. | Jan. 5, 1954 |
| 2,672,050 | Sewell | Mar. 16, 1954 |
| 2,711,480 | Friedman | June 21, 1955 |
| 2,737,595 | Scherbatskoy | Mar. 6, 1956 |
| 2,769,097 | Lord | Oct. 30, 1956 |
| 2,770,736 | Krasnow | Nov. 13, 1956 |
| 2,782,370 | Ver Nooy | Feb. 19, 1957 |